3,589,892
PROCESS FOR LIBERATING COPPER FROM SULFIDE ORES
David T. Peterson, Ames, Iowa, assignor to Iowa State University Research Foundation, Inc., Ames, Iowa
No Drawing. Filed Feb. 23, 1968, Ser. No. 707,403
Int. Cl. C22b *15/06, 15/14*
U.S. Cl. 75—72                                      6 Claims

ABSTRACT OF THE DISCLOSURE

In the production of copper from sulfide ores, it is conventional to prepare by mineral-dressing operations a finely divided concentrate composed principally of copper sulfides and iron sulfides. Instead of forming the concentrate into a matte and conversion of the matte to blister copper, the concentrate is roasted without melting under oxidizing conditions to a finely divided mixture of copper oxides and iron oxides. This intermediate product is then heated under selective reducing conditions to reduce the copper oxide to metallic copper without appreciably reducing the iron oxide. By virtue of this series of heating steps where the copper is first oxidized and then reduced, an opportunity is provided for the growth in size of the copper particles. The product will therefore contain metallic copper in the form of relatively large particles which can be recovered by conventional mineral-dressing operations, for example, by grinding and flotation.

BACKGROUND

A large portion of the production of copper comes from sulfide ores which are concentrated by mineral-dressing methods to a finely ground concentrate consisting primarily of iron and copper sulfides. This concentrate is melted in a smelting operation, sometimes after a preliminary drying and partial roasting, to form a slag consisting primarily of ferrous silicate and a "matte" which is a liquid solution of iron sulfide and cuprous sulfide. The liquid matte is oxidized with oxygen from the air in the presence of a silica flux in a converter. The products are a liquid cuprous sulfide, "white metal" and a ferrous silicate slag. The white metal is oxidized, by blowing air through it, to "blister" copper. The blister copper is further purified by fire refining and cast into anodes for electrolytic purification and recovery of the precious metals.

In the conventional "matte" process, as described above, very large amounts of heat are required, particularly in the smelting operation. The fuel is usually coal or petroleum fuel that do not ordinarily occur in proximity to sulfide ore deposits. Consequently, either the fuel or the ore concentrate must be shipped long distances, both the fuel and the ore concentrate being required in large quantities at the smelting and conversion plant. A lower temperature process using less fuel for the liberation of copper from sulfide ores would therefore provide substantial economic advantages. Further, the matte process involves the waste of potentially recoverable materials, which would have an economic value.

In the matte process if a roasting step is employed to adjust the sulfur content, only a small percent of the sulfur is removed as sulfur dioxide, and this is not ordinarily recovered, and used for manufacturing products such as sulfuric or sulfurous acids. Moreover, in the convertor furnace operation, the sulfur dioxide is driven off in such an impure form that it is not practical to recover it for manufacturing by-products.

Another source of waste in the matte process is the copper which dissolves in the slag formed during the smelting operation. The slag will usually contain at least 0.3 to 0.5% copper, and a typical smelting furnace may make more than 500 tons of slag per day. Every additional 0.1% of copper in the slag may therefore mean an additional loss of a half a ton of copper per day. Copper in the slag is due in part to unreduced copper oxide that combines chemically with the silicate, but chiefly to imperfect separation of the matte from the slag. It would therefore be desirable to develop a process in which the necessity of producing and separating a silicate slag is eliminated.

Still another source of economic loss in the process is that the iron content of the ore is not salvaged, but instead becomes a worthless waste. The iron is separated from the copper as a ferrous silicate in the slag, and the slag is a waste material having little or no economic value. It would therefore be desirable to provide a process in which the iron content of the ore can be recovered in usable form.

SUMMARY

The process of this invention involves a sharp departure from the matte process. Relatively little heat is required since the smelting operation is completely eliminated, and the material is processed throughout at temperatures lower than the melting point of copper (1083° C.). In the initial step of the process, the concentrate of copper and iron sulfides is oxidized to copper oxides and iron oxides. Since the reactions involved are highly exothermic, little or no added heat is required. The heat is controlled, however, to promote the conversion without melting any portion of the finely divided material, and the temperature may gradually increase as the conversion proceeds to substantial completion. Further, it is feasible to conduct this roasting operation so that the sulfur dioxide formed by the reactions is driven off in a sufficiently pure and concentrated form for economic recovery and utilization in by-products.

The finely divided intermediate product composed principally of copper oxides and iron oxides is further processed by heating at a temperature below the melting point of copper and without melting any of the components. The second heating or roasting step is carried out under reducing conditions which selectively reduce the copper oxides to metallic copper without appreciably reducing the iron oxides. The resulting product will contain the metallic copper in the form of relatively large particles which can be separated and recovered by conventional mineral-dressing operations. The product will also contain the iron in the form of particles of iron oxides, which can be recovered as a by-product during the mineral-dressing operations. The iron oxides thus recovered can be pelletized, after leaching to remove the last traces of copper, and used as iron ore. The copper powder which can be recovered by flotation or other suitable separation procedures, can be pressed, either cold or hot, or compacted by powder rolling to anode shapes that can be further purified by electrolysis, according to the standard practice for the blister copper of the matte process.

DETAILED DESCRIPTION

In the processing of sulfide ores, the ores are crushed and ground, and processed in a concentration mill to produce a concentrate of finely divided material composed principally of copper sulfides and iron sulfides, and/or complex copper iron sulfides like bornite ($Cu_3FeS_3$) and chalcopyrite ($CuFeS_2$). The ore may also contain less common minerals of arsenic, silver, mercury, tellurium, etc. It is this "concentrate" which forms the preferred starting material for the process of the present invention. The concentrate can be formed by various methods including classification and/or flotation procedures. The copper content of the concentrate should be as high as possible. However, concentrates or ores containing about 25–40% copper in the form of cuprous sulfide (CuS) can be used. The particle size of the concentrate is not particularly critical, and will depend on the particular mineral-dressing procedures employed to produce it. In general, the material will range from about plus 50 mesh to minus 400 mesh (American Standard Screens).

In accordance with the present invention, the concentrate is first roasted under oxidizing conditions to oxidize the copper and iron sulfides to copper and iron oxides. In this step, the desired reactions can be represented as follows:

(1)  $2CuS + 3O_2 \rightarrow 2CuO + 2SO_2\uparrow$ (2)  $2FeS_2 + 5O_2 \rightarrow 2FeO + 4SO_2\uparrow$ It is important that the roasting be carried out at a temperature below the melting point of copper sulfides, iron sulfides and the resulting oxides and preferably at temperatures substantially below the melting point if copper is employed. However, the temperature should be sufficiently high to promote the conversion of copper sulfides and iron sulfides, respectively, to copper oxides and iron oxides. To avoid an unduly long time for completion of the roasting step, a temperature of above 400° C. and preferably above 500° C. is advantageous, and the temperature can be progressively increased as the oxidation proceeds. Usually, it will not be necessary to exceed a temperature of 1000° C. for any portion of the conversion, and temperatures of 900° C. or less can be employed. For example, good results can be obtained within the temperature range of 500 to 900° C., the temperature being gradually increased from the lower portion to the upper portion of this range during the conversion.

The oxidizing conditions are provided by continuously contacting the heated concentrate with an oxidizing gas, which will contain oxygen as the oxidizing ingredient. For example, air can be used as the oxidizing gas, or air enriched with added oxygen, or oxygen employed either alone or diluted with an inert gas. Since air is satisfactory and is the cheapest oxidizing gas, it will usually be advantageous to blow air through the concentrate as it is being heated with suitable agitation. Various apparatus can be used for the roasting step, including the type of apparatus employed for preliminary roasting of the concentrate in the matte process to adjust the sulfur content for formation of a matte of cuprous sulfide and ferrous sulfide. This includes the so-called "shaft" roasting furnace or the McDougall-type roasting furnace. Where it is desired to recover the sulfur dioxide, it may be desirable to employ a fluidized bed with the air being blown through the bed.

During the oxidizing, it will usually not be necessary to add heat, but the concentrate can be preheated to the initial roasting temperature, such as to a temperature of 400 or 500° F. If desired, additional heat can be used during the roasting, but the temperature should be controlled as previously described, and no portion of the concentrate should be melted as the copper and iron sulfides are converted to copper and iron oxides, the concentrate thereby remaining in finely divided condition for further processing.

Optimally, the roasting is continued until substantially all of the sulfur is driven off as sulfur dioxide, and substantially all of the cupric sulfide is converted to cupric oxide. Since the ferrous sulfide is more readily oxidized than the cuprous sulfide, it will be converted first to ferrous oxide, and therefore after substantially all of the ferrous sulfide has been converted to ferrous oxide, the oxidation should be continued until at least 90% of the copper has been oxidized to a copper oxide, and preferably to cupric oxide (CuO). The residual sulfur content may also be used as a measure of completion of the reaction, and should at least be reduced to below 5% by weight of the roasted concentrate, and preferably to below 0.5% by weight. Where the roasting is continued for 12 to 36 hours, 95% or more of the copper can be converted to cupric oxide, and the resulting intermediate product will contain the cupric oxide in admixture with iron oxides, principally ferrous oxide (FeO), although some ferric oxide ($Fe_2O_3$) and magnetite ($Fe_3O_4$) may also be present. The intermediate product may also contain small percentages of cupric sulfide (CuS) and cuprous oxide ($Cu_2O$).

The intermediate product is then reduced in a further heating or roasting operation to convert the copper oxides to metallic copper without producing any significant amount of metallic iron or reducing the iron below ferrous oxide (FeO). A desired reaction where hydrogen is the reducing gas is as follows:

(3)  $CuO + FeO + H_2 \rightarrow Cu + FeO + H_2O\uparrow$

It will be seen that the foregoing equation involves the selective reduction of the copper. For example, a hydrogen-containing reducing gas can be employed which has the characteristic of selectively reducing copper oxides to metallic copper without appreciably reducing ferrous oxide. The required hydrogen content to accomplish this result can be readily calculated from free energy tables. For example, the reducing gas may be a mixture of steam and hydrogen, or a mixture of steam, hydrogen and carbon monoxide (viz. water gas). In terms of hydrogen content, the desired selective reducing capacity of the gas will usually be obtained at less than 50 mol percent hydrogen while the reduction will proceed more slowly than desired at less than 2 mol percent hydrogen. For example, the reducing gas can advantageously contain from 20–40 mol percent hydrogen ($H_2$), or will have a reducing capacity equivalent thereto. Alternatively, other reducing gases of equivalent reducing capacity can be used, such as mixtures of carbon monoxide (CO) and carbon dioxide ($CO_2$).

The reduction heating can be carried out in various types of apparatus where the finely divided material is agitated and brought into continuous contact with the reducing gas. Provision should be made for the addition of heat, since the reduction is an endothermic reaction. For example, the heat reduction step can be carried out in a rotary kiln. Alternatively, a fluidized bed can be used with the reducing gas passed therethrough after preheating to the desired reaction temperature. Generally, the temperatures employed can be similar to those in the oxidation step, that is, they should be substantially below the melting point of copper while high enough to promote the reduction of the copper oxide to metallic copper. Temperatures in the range of 400–1000° C. can be used, while temperatures ranging from 500–900° C. are particularly desirable.

The heat reduction is preferably continued until at least 90% of the copper is in the form of particles of metallic copper. Within heating times of from 12 to 36 hours, an excess of 95% of the copper can be converted to metallic copper. An excess of 95% of the iron and preferably 99% or more will remain as ferrous oxide or other iron oxides. The resulting product will thereby comprise primarily a mixture of metallic copper with ferrous oxide. By virtue of the heating in the oxidizing and reduction steps, and particularly in the reduction step, an opportunity is provided for the copper particles to increase in size. It is therefore feasible to produce a product containing most of the copper in the form of particles of metallic copper which can be recovered by ordinary mineral-dressing operations, such as flotation, magnetic separation, classification, etc. Since flotation separation of the metallic copper from the ferrous oxide is particularly desirable, the product should contain the metallic copper in the form of particles having an average size substantially greater than 325 mesh (American Standard Screen). For example, a product can be produced where the copper particles range in size from plus 325 mesh to minus 100 mesh, and are therefore readily adapted for flotation separation, according to procedures well known in the flotation art. Any larger size particles of metallic copper can be separated by the classification procedure prior to the flotation.

While this invention is not concerned, as such, with conventional mineral-dressing procedures, the applicable procedures can be indicated. Usually, it will be desirable to subject the mixture of metallic copper and ferrous oxide to fine grinding, thereby producing substantially separate particles of copper and ferrous oxide or magnetite. The ground material can be classified to remove the over and undersize, and produce a flotation feed with all of the particles in the desired size range. In the flotation step, the copper particles can be readily separated from the particles of iron oxide. These materials can then be further processed in accordance with known procedures. For example, the copper powder can be formed into anode shapes which can be further purified by electrolysis, and the iron oxide can be pelletized for use as an iron ore. If desired, the iron oxide can be leached before pelletizing to remove any traces of metallic copper. These steps, however, are optional and do not form a necessary part of the present invention.

In laboratory tests relating to the process, a sample of bornite ($Cu_3FeS_3$) was used. The bornite sample had a copper concentration of about 50 weight percent Cu. Bornite, being a complex copper-iron sulfide has the copper and iron most closely associated of any type of mineral and should be harder to separate than a physical mixture of iron sulfides and copper sulfides. The bornite was ground to about minus 200 mesh and oxidized in air for 24 to 48 hours in a shallow tray heated to about 500–600° C. While no analytical test was made to determine the completeness of oxidation to copper and iron oxides, a microscopic examination qualitatively showed almost no unoxidized sulfide particles.

Portions of the oxidized ore were selectively reduced at temperatures of 500°, 600°, 700°, 800°, 900° C. and 1000° C. The reductions were done with a mixture of 50 mol percent hydrogen and 50 mol percent water vapor at a pressure of 50 mm. The reduced pressure was used in order to help prevent condensation of water in the apparatus. The reduction time was 4 hours. The samples after reduction were mounted, polished and examined microscopically to verify that the reduction was selective, that is, the copper oxides were reduced and the iron oxides were not, and that the copper agglomerated into suitable sized particles.

A further example of the process is as follows:

A copper concentrate containing 30 weight percent copper, 28 weight percent iron and 32 weight percent sulfur and having a particle size smaller than 325 mesh is roasted in a multiple hearth roaster. The roasting is done at 750° C. and the rate of feed and through-put is adjusted so that the product consists primarily of $Fe_2O_3$ and CuO. The sulfur content is maintained below one weight percent. The oxidation in the roaster is accomplished by oxygen in air admitted at the lower hearths.

The roasted concentrate is fed into a rotating horizontal kiln which is maintained at 800° C. The selective reduction of the copper oxides is done by a mixture of carbon dioxide, carbon monoxide, hydrogen, water vapor and nitrogen reduced by burning natural gas with a deficiency of air. The amount of air is adjusted so that the ratio of hydrogen to water vapor in the gas is about 1.8. The rotating kiln is operated so that the charge remains in the kiln for about 4 hours. At these temperatures and times more than 99 percent of the copper oxides will be reduced to copper metal. More than 99 percent of the iron will be in the form of iron oxides, principally magnetite, $Fe_3O_4$. The hot charge is cooled by dumping, or quenching, into water.

The mixture of copper metal and iron oxides is ground in a wet ball mill and ground product pumped to a bank of flotation cells. The copper metal and any copper sulfide particles are floated with the aid of a xanthate collector and pine oil frother. A magnetic separator is used to remove any particles containing magnetite. These are recycled to the ball mill. The froth concentrate, which is 95 percent copper, is dried and pressed into the form of anodes for electrolytic purification. The pressed anodes are sintered at 500° C. before shipment to the electrolysis operation.

The nonfloating material from the floation cells is pumped to leaching tanks where it is contacted with a solution of sulfuric acid and ferric sulfate. This nonfloating material is primarily magnetite but contains about 3 percent copper. The copper is dissolved by the leaching solution. The copper in the leach solution is recovered by electrowinning in an electrolysis cell. Leaching is done for 36 hours at a temperature of 35–40° C. The residue from the leaching tanks contains less than 0.1 weight percent copper and more than 60 weight percent iron. It is filtered, dried and pelletized for use as blast furnace field stock.

While in the foregoing specification this invention has been described in relation to specific embodiments thereof, and many details have been set forth for the purpose of illustration, it will be apparent to those skilled in the art that the invention is susceptible to additional embodiments, and that certain of the details described herein can be varied without departing from the basic principles of the invention.

I claim:

1. In the production of copper from sulfide ores where there is obtained a finely divided concentrate composed principally of copper and iron sulfides, the improved process for liberating the copper in recoverable form, characterized by the steps of:
    (a) roasting said concentrate of copper and iron sulfides in contact with an oxygen providing oxidizing gas at a temperature substantially below the melting point of copper but sufficiently high to promote the conversion of said copper and iron sulfides to oxidizes, said roasting being continued until substantially all of the iron and at least 90% of the copper has been oxidized, thereby obtaining a finely divided intermediate product composed principally of copper and iron oxides; and
    (b) heating said intermediate product in contact with a reducing gas having the characteristic of selectively reducing copper oxide to metallic copper without appreciably reducing FeO, said heating being at a temperature substantially below the melting point of copper but sufficiently high to promote said selective reduction, said selective reduction being continued until at least 90% of the copper is in the form of particles of metallic copper having an average size substantially greater than 325 mesh (American Standard Screen) while said iron remains substantially in oxide form, whereby the metallic copper thus produced in admixture with iron oxides can be separated from the iron oxide and recovered by conventional mineral dressing and beneficiation procedures, such as grinding and floatation.

2. The improved process of claim 1 wherein said roasting is carried out at a temperature above 200° C. up to 1000° C. and said oxidizing gas is air.

3. The improved process of claim 1 wherein said reducing gas contains from 2–50 mol percent of hydrogen and said reduction heating is at a temperature above 400° C. up to above 1000° C.

4. In the production of copper from sulfide ores where there is obtained a finely divided concentrate composed principally of copper and iron sulfides, the improved process for liberating the copper in recoverable form, characterized by the steps of:
    (a) roasting said concentrate of copper and iron sulfides in contact with air at a temperature of from 500–900° C. and continuing said roasting under oxidizing conditions until substantially all of the iron and at least 90% of the copper has been oxidized, thereby obtaining a finely divided intermediate product composed principally of copper and iron oxides; and (b) heating said intermediate product in contact with a reducing gas containing from 20–40 mol percent hydrogen, continuing said reducing heating until at least 90% of the copper is in the form of particles of metallic copper having an average size substantially greater than 325 mesh (American Standard Screen), and said reduction heating being terminated while at least 95% of the iron remains in oxide form, whereby the metallic copper thus produced in admixture with iron oxide can be separated from the iron oxide and recovered by conventional mineral dressing and beneficiation procedures, such as grinding and flotation.

5. In the production of copper from sulfide ores where there is obtained a finely divided concentrate composed principally of CuS and FeS and containing from 25–40% by weight copper, the improved process for liberating the copper in recoverable form, characterized by the steps of:

(a) roasting said concentrate of copper and iron sulfides in contact with an oxygen providing oxidizing gas at a temperature substantially below the melting point of copper but sufficiently high to promote the conversion of said CuS and FeS to CuO and FeO, said roasting being continued until substantially all of said FeS and at least 90% of said CuS has been oxidized, thereby obtaining a finely divided intermediate product composed principally of CuO and FeO; and (b) heating said intermediate product in contact with a reducing gas having the characteristic of selectively reducing CuO to metallic copper without appreciably reducing FeO, said heating being at a temperature substantially below the melting point of copper but sufficiently high to promote said selective reduction, said selective reduction being continued until at least 90% of the copper is in the form of particles of metallic copper having an average size substantially greater than 325 mesh (American Standard Screen), and said reduction heating being terminated while at least 95% of the iron remains in oxide form, whereby the metallic copper thus produced in admixture with iron oxide can be separated from the iron oxide and recovered by conventional mineral dressing and beneficiation procedures, such as grinding or flotation.

6. The improved process of claim 5 wherein said roasting is carried out at a temperature of from 500–900° C., said oxidizing gas is air, said reducing gas contains from 20–40 mol percent hydrogen, said reduction heating is at a temperature of from 500–900° C. and is completed while at least 99% of the iron remains in oxide form.

References Cited

UNITED STATES PATENTS

| | | | |
|---|---|---|---|
| 3,212,883 | 10/1965 | Cech | 75—72 |
| 3,311,466 | 3/1967 | Curlook | 75—72X |
| 3,351,462 | 11/1967 | Arentzen | 75—10X |

HYLAND BIZOT, Primary Examiner

J. E. LEGRU, Assistant Examiner

U.S. Cl. X.R.

75—76

UNITED STATES PATENT OFFICE
CERTIFICATE OF CORRECTION

Patent No. 3,589,892         Dated June 29, 1971

Inventor(s) David T. Peterson

It is certified that error appears in the above-identified patent and that said Letters Patent are hereby corrected as shown below:

Claim 3, Col. 6, 8th line from the bottom,

"above" should read -- about --

Signed and sealed this 16th day of November 1971.

(SEAL)
Attest:

EDWARD M. FLETCHER, JR.                ROBERT GOTTSCHALK
Attesting Officer                      Acting Commissioner of Patents